E. E. PRETTYMAN.
BOOK OR LESSON MARKER AND PAPER CUTTER.
APPLICATION FILED SEPT. 15, 1915.
1,193,421.  Patented Aug. 1, 1916.
Fig. 1.
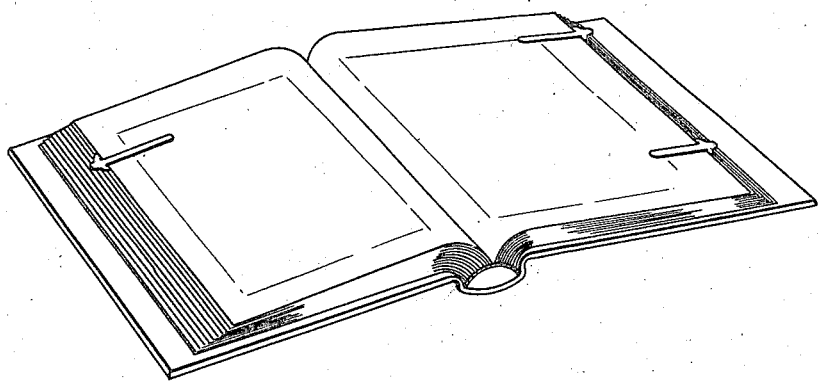
Fig. 2.
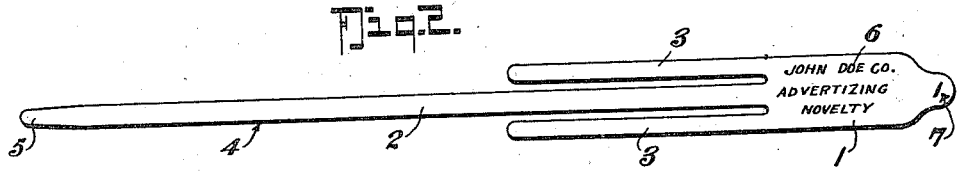
Fig. 3.
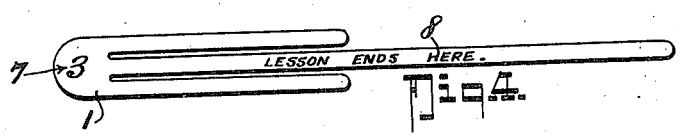
Fig. 4.
Fig. 5.
WITNESS.
Charles J. Diller.
INVENTOR
Edith E. Prettyman
BY
Fred G. Dieterich
ATTORNEYS.

UNITED STATES PATENT OFFICE.

EDITH E. PRETTYMAN, OF PORTLAND, OREGON.

BOOK OR LESSON MARKER AND PAPER-CUTTER.

1,193,421.  Specification of Letters Patent.  Patented Aug. 1, 1916.

Application filed September 15, 1915. Serial No. 50,804.

*To all whom it may concern:*

Be it known that I, EDITH E. PRETTYMAN, residing at Portland, in the county of Multnomah and State of Oregon, have invented certain new and useful Improvements in Book or Lesson Markers and Paper-Cutters, of which the following is a specification.

My invention relates to certain new and useful improvements in lesson marking devices whereby students may be enabled to mark or indicate the place or places wherever lessons are to be found.

The invention also has for its object to provide a device that can be used not only as a lesson marker but as a book mark and a paper knife and is so designed and arranged that it can contain advertising matter and thus serve as an advertising novelty.

In its more detailed nature, the invention also resides in those novel features of construction, combination and arrangement of parts, all of which will be first fully described, then be specifically pointed out in the appended claims and illustrated in the accompanying drawing, in which:—

Figure 1 is a perspective view illustrating the use of the invention. Fig. 2 is a plan view of one form of the invention showing how advertising matter may be placed on the device. Figs. 3 and 4 are plan views of lesson markers showing the serial numbering and also showing how markers may be provided with indicating words to indicate the place of commencement and termination of a particular lesson. Fig. 5 is a cross section of the long tongue or blade showing the sharpened edge.

In the drawing, in which like numerals indicate like parts in all of the figures, 1 represents the body portion of the device which is provided with three longitudinal tongues arranged parallelly, the central tongue 2 being longer than the side tongues 3 and is preferably sharpened along one edge 4 and at the point 5 so as to serve as a paper cutter.

The body portion 1 of the device may be made sufficiently large to contain advertising matter 6 and also is provided with a space on which serial numbers 7 may be impressed.

In the practical application of the invention the devices for use as lesson markers are to be made in sets and numbered consecutively and they are also to be made in different colors to mark the lines where the lesson begins and ends or the devices may be provided with indicating words 8 to advise the user as to where the lesson begins and where it ends, it being understood while in use that one marker is located at the place of commencement of the lesson and another at the place of termination, as shown, for instance, at the right hand side of Fig. 1. When used simply as a book mark or a line indicator, the device can be applied as indicated at the left of Fig. 1 or at any other desired location on the leaf.

The device in practice may be made with or without ornamentation, as desired, and the entire device may be made of celluloid, aluminum, wood, wood pulp or any kind of metal or other suitable material and I do not desire to limit myself as to these details of construction.

From the foregoing description taken in connection with the accompanying drawing, it is thought the complete construction and advantages of my invention will be readily understood by those skilled in the art to which it relates.

What I claim is:

1. A device of the character described comprising a body portion and a plurality of tongues extending parallelly from said body portion, the mid-tongue being of greater length than the side tongues, said mid-tongue having a sharpened edge to serve as a paper cutter, said body portion and said tongues being integrally formed from a single piece of material, said tongues lying normally in a single plane throughout their entire length.

2. A device of the character described comprising a body portion and a plurality of tongues extending parallelly from said body portion, the mid-tongue being of greater length than the side tongues, said body portion being adapted to receive advertising matter and having a space provided with a serial number, said tongues lying normally in a single plane throughout their entire length.

3. A device of the character described comprising a body portion and three tongues extending from one end of said body portion in the longitudinal direction of the same, two of said tongues being short and the middle tongue being longer than the other two tongues, said device having means for indicating the lesson, said tongues lying normally in a single plane throughout their entire length.

EDITH E. PRETTYMAN.